Oct. 5, 1954  L. V. GILADETT  2,690,669
PRESSURE VALVE
Filed Oct. 15, 1953
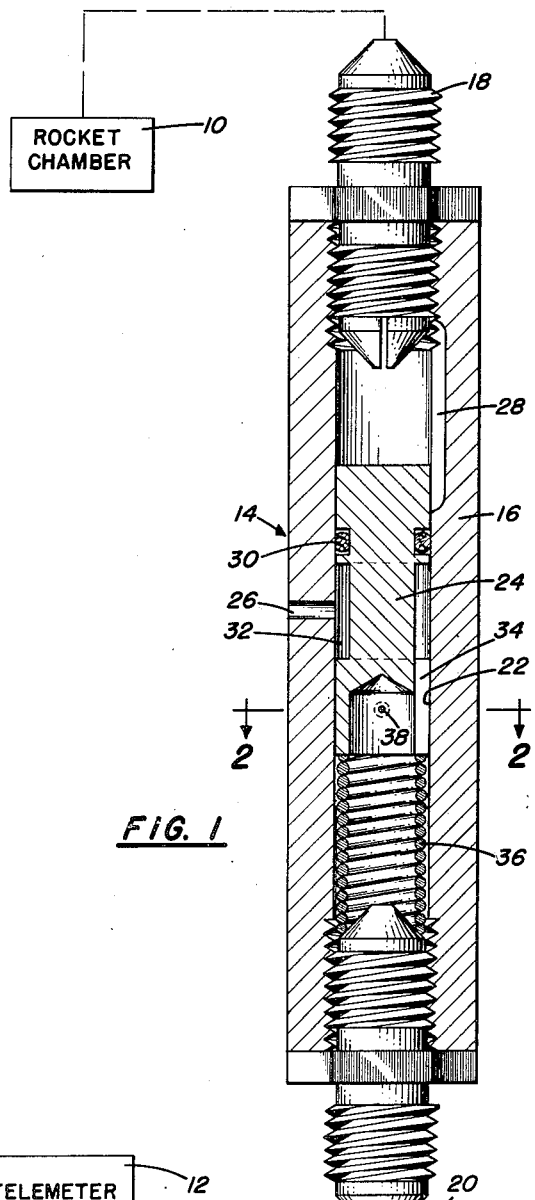
FIG. 1
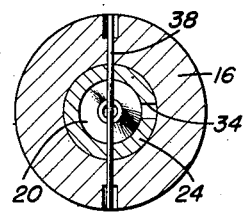
FIG. 2
INVENTOR
LEO V. GILADETT
BY
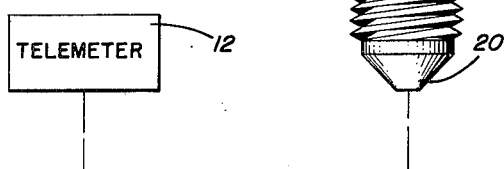
ATTORNEYS Patented Oct. 5, 1954

2,690,669

UNITED STATES PATENT OFFICE 2,690,669

PRESSURE VALVE

Leo V. Giladett, Silver Spring, Md.

Application October 15, 1953, Serial No. 386,412

6 Claims. (Cl. 73—116)

(Granted under Title 35, U. S. Code (1952), sec. 266)

The invention described herein may be manufactured and used by or for the Government of the United States of America for governmental purposes without the payment of any royalties thereon or therefor.

This invention relates to devices for controlling the operation of airborne instruments, controls or the like.

Rockets have been used for exploring the heights, and since the rockets are pilotless, means must be provided to actuate the various instruments which obtain information and record, transmit, photograph, or otherwise deal with it. An object of this invention is to provide a valve which is responsive to a successive increase and decrease of pressure, such as would be found in the rocket fuel burning chamber prior to and at burnout.

A typical use for such a valve involves a specific application of the invention combined with a telemeter and the rocket chamber. Accordingly, a more specific object of the invention is to provide a valve that communicates with a rocket chamber so that the increase in pressure at initial rocket ignition may be used to release a valve element lock but hold the element against the bias of a spring, meanwhile the telemeter is exposed to atmospheric or rocket ambient pressure through a valve port, and then at burnout with the accompanying decrease in pressure, the spring may move the valve element in the valve body to establish, through a valve passageway, communication between the telemeter and the rocket chamber, which would be under rocket base pressure.

Other objects and features of importance will become apparent in following the description of the illustrated form of the invention.

Fig. 1 is a partially schematic longitudinal sectional view of one embodiment of the invention, and Fig. 2 is a transverse sectional view taken on the line 2—2 of Fig. 1 and in the direction of the arrows.

In the drawing a rocket chamber 10 is illustrated schematically, as is a telemeter 12, the latter being a high-accuracy pressure sensing device that telemeters its sensings to a ground receiver, and it is representative of any type of device reasonably adaptable for actuation by an embodiment of the invention. The valve 14 includes a valve body 16 which has screw threaded or other couplings 18 and 20 at opposite ends, coupling 18 being provided for hose or direct connection with rocket chamber 10, and coupling 20 being adapted to connect similarly, to a diaphragm chamber or the like in telemeter 12.

Valve body 16 is provided with a valve chamber 22 in which valve element 24 is slidable to control port 26 and the bypass or passageway 28, each formed in valve body 16. For this purpose the valve element 24 is constructed as a piston and has ring 30 in a ring groove. An annular channel 32 is provided on element 24, and groove 34 connects the annular channel with an end of the valve element to provide means for applying ambient pressure from the exterior of body 16 to chamber 22 on one side of valve element 24. Coupling 20 has its bore in communication with chamber 22 on the same side of valve element 24, whereby rocket ambient pressure is applied to telemeter 12 when valve element 24 is in its illustrated position.

Passageway 28 is formed longitudinally of the body 16 and is arranged to establish communication between the telemeter and rocket chamber 10. This takes place since the coupling 18 opens into the valve chamber, and passageway 28 is of such length that the annular channel 32 is open to it when element 24 is moved in the chamber 22 to such position that element 24 closes port 26.

Resilient means, as spring 36 reacting on valve body 16 and element 24 constantly bias the element 24 in one direction, and means are provided to prevent the spring 36 from moving the element 24. The locking means consist of a shear pin or wire 38 disposed in alignable openings in valve element 24 and valve body 16. Shear wire 38 is of such shear strength that it will withstand the force exerted by the compressed spring 36, but will be broken by the larger force exerted by rocket chamber pressure.

Operation of the invention is as follows:

Assuming that the rocket is at rest, the valve element 24 is moved, compressing spring 36 until shear wire 38 can be fitted in its passage in the valve body 16 and element 24. In this position the spring is compressed to almost solid length, and the wire 38 is strong enough to hold the spring in the compressed condition. Then the rocket is set into flight, rocket chamber pressure being applied through coupling 18, to element 24, moving the latter slightly in valve chamber 22 to completely compress spring 36 (Fig. 2). The force derived from rocket chamber pressure is great enough to shear wire 38. During this procedure, port 26 which is exposed to ambient pressure, is open to the telemeter through channel 32, groove 34 and a part of valve chamber 22.

Therefore, the telemeter is not exposed to high rocket chamber pressures at any time.

When the rocket chamber pressure decreases, as at rocket burnout, spring 36 moves valve element 24 in valve chamber 22, closing atmosphere port 26, and communicating telemeter 12 with the rocket chamber 10 through passageway 28 which opens into groove 32. At and after burnout the rocket chamber pressure is the base pressure of the rocket, and as such, has no deleterious effect on the instrument 12, but rather, is useful.

It is understood that various modifications may be made without departing from the following claims.

What is claimed is:

1. In a rocket having a rocket chamber and a telemeter sensitive to pressures, a device to control the operation of said telemeter comprising a valve body provided with a valve chamber, means connecting said valve chamber with the rocket chamber so that the rocket chamber pressure is applied to said valve chamber, a valve element disposed in said valve chamber, said body having a port adapted to open to the atmosphere and controlled by said valve element, means connecting to telemeter to said body for application of atmospheric pressure to the telemeter through a part of the valve chamber and said port, means yieldingly urging said valve element in one direction, with a force less than that exerted by rocket chamber pressure on said element, a lock holding said valve element fixed in said body and openable in response to a force greater than that exerted by said yielding means, so that the rocket chamber pressure applied to said valve element opens said lock, said valve element being arranged to close said port when moved by said yielding means, and means in said body to apply rocket chamber pressure to said connecting means when the rocket chamber pressure has receded to a value such that the force exerted by it on said piston is exceeded by the force of the yielding means.

2. The device of claim 1 wherein the last mentioned means comprising a passageway in said body that is controlled by a part of said piston.

3. The device of claim 2 and said valve element comprising a piston having a passageway which is in communication with said port during a portion of the operational range of said piston in said valve chamber.

4. An attachment to connect with a telemeter carried by a rocket comprising a valve body having a valve chamber, means in said body to apply atmospheric pressure to the telemeter, the rocket having a rocket chamber to the pressures in which the valve chamber is exposed, a valve element in said valve chamber controlling said means and maintaining said means open while the pressure in said valve chamber is above a predetermined level, and means in said body to apply rocket chamber pressure to the telemeter when the rocket chamber pressure falls below a predetermined level.

5. An attachment to connect with a telemeter carried by a rocket comprising a valve body having a valve chamber, means in said body to apply atmospheric pressure to the telemeter, the rocket having a rocket chamber to the pressures in which the valve chamber is exposed, a valve element in said valve chamber controlling said means and maintaining said means open while the pressure in said valve chamber is above a predetermined level, and means in said body to apply rocket chamber pressure to the telemeter when the rocket chamber pressure falls below a predetermined level, including a by-pass for said valve element operable to pass the valve element when the latter is in predetermined position in said valve chamber, and a spring contacting said valve element and said valve body constantly urging said valve element in one direction.

6. The attachment of claim 5 and; a shear wire holding said valve element in said valve body in such position that said spring is held compressed, and said shear wire being of shear strength sufficient to retain the force of said spring and being fracturable in response to rocket chamber pressure.

References Cited in the file of this patent

UNITED STATES PATENTS

| Number | Name | Date |
|---|---|---|
| 2,303,392 | Scaramucci | Dec. 1, 1942 |
| 2,660,187 | Welty et al. | Nov. 24, 1953 |